United States Patent
Uchibori

(10) Patent No.: US 8,981,726 B2
(45) Date of Patent: Mar. 17, 2015

(54) SECONDARY BATTERY SYSTEM AND CHARGING SYSTEM FOR SECONDARY BATTERY

(75) Inventor: Takuji Uchibori, Kyoto (JP)

(73) Assignee: GS Yuasa International Ltd., Kyoto-Shi, Kyoto (JP)

( * ) Notice: Subject to any disclaimer, the term of this patent is extended or adjusted under 35 U.S.C. 154(b) by 400 days.

(21) Appl. No.: 13/349,461

(22) Filed: Jan. 12, 2012

(65) Prior Publication Data
US 2012/0181988 A1    Jul. 19, 2012

(30) Foreign Application Priority Data

Jan. 14, 2011 (JP) .................................. 2011-006349
Dec. 1, 2011 (JP) .................................. 2011-263291

(51) Int. Cl.
| | |
|---|---|
| H02J 7/00 | (2006.01) |
| H01M 10/44 | (2006.01) |
| H01M 2/34 | (2006.01) |
| H01M 10/48 | (2006.01) |

(52) U.S. Cl.
CPC .............. *H01M 10/44* (2013.01); *H01M 2/348* (2013.01); *H01M 10/48* (2013.01); *H02J 7/0029* (2013.01)
USPC ............................. 320/134; 320/135; 320/136

(58) Field of Classification Search
USPC .................................................. 320/134–136
See application file for complete search history.

(56) References Cited

U.S. PATENT DOCUMENTS

| | | | | |
|---|---|---|---|---|
| 6,992,463 | B2* | 1/2006 | Yoshio | 320/134 |
| 7,538,519 | B2* | 5/2009 | Daou et al. | 320/134 |
| 7,619,392 | B2* | 11/2009 | Wang et al. | 320/134 |
| 2002/0190694 | A1* | 12/2002 | Saeki et al. | 320/135 |
| 2005/0242779 | A1* | 11/2005 | Yoshio | 320/134 |
| 2006/0187602 | A1* | 8/2006 | Kawagoe et al. | 361/91.1 |
| 2009/0220825 | A1* | 9/2009 | Nakashima et al. | 429/7 |
| 2009/0273314 | A1* | 11/2009 | Yoshikawa | 320/134 |

FOREIGN PATENT DOCUMENTS

JP    2007-236033 A    9/2007

* cited by examiner

*Primary Examiner* — Samuel Berhanu
(74) *Attorney, Agent, or Firm* — McGinn IP Law Group, PLLC

(57) ABSTRACT

A secondary battery system includes a secondary battery, an abnormality detecting unit OC which detects whether the secondary battery has become abnormal, and a signal generating circuit which outputs a signal to an externally connected device based on detection information of the abnormality detecting unit OC. The signal generating circuit includes a circuit element that can be held at least in a first state and in a second state. The signal generating circuit is configured to change an output state of a signal to the externally connected device based on whether the circuit element is in the first state or in the second state. The signal generating circuit is configured to switch the circuit element from the first state to the second state when the abnormality detecting unit OC has detected the abnormal state, and not to return the circuit element to the first state.

15 Claims, 4 Drawing Sheets

SECONDARY BATTERY SYSTEM AND CHARGING SYSTEM FOR SECONDARY BATTERY

BACKGROUND OF THE INVENTION

1. Field of the Invention

The present invention relates to a secondary battery system that includes a secondary battery, an abnormality detecting unit which detects one or more abnormalities of the secondary battery, and a signal generating circuit which outputs a signal to an externally connected device which operates in cooperation with the secondary battery based on detection information of the abnormality detecting unit, and also relates to a charging system for a secondary battery.

2. Description of the Related Art

Such a secondary battery system is provided in many cases in a configuration of what is called a battery pack, or in a configuration having a monitoring circuit of a secondary battery built in a casing of the secondary battery, for example. In the case of connecting between a charger and a secondary battery system by using the charger as the externally connected device, for example, the secondary battery system can be configured by combining a secondary battery with a circuit as a countermeasure against a case where the secondary battery has become in an abnormal state such as a case where an excessive current or voltage has been applied to the secondary battery during charging the secondary battery by the charger.

As such a configuration, there are considered a configuration in which a current interrupting device is arranged at a secondary battery system side in a supply path of a charging current from a charger to a secondary battery within a battery pack, a configuration in which a charge prohibition signal is output to a charger to cause the charger itself to stop a charge operation, and a configuration in which both of these configurations are included, as described in JP-A-2007-236033, for example.

As described in JP-A-2007-236033, according to the configuration in which a charge prohibition signal is output from a secondary battery side to a charger, a secondary battery system can have a configuration for stopping a charge current to a secondary battery with suppressing the increase of the manufacturing cost as much as possible, with use of a charge current interrupting function at a charger side.

However, it is not preferable to continuously use a secondary battery system that has once become in an abnormal state, even after the abnormal state has been improved.

For example, according to the configuration using the charge current interrupting function at the charger side, when this function is reset at the charger side, a charge operation to a secondary battery is restarted and the secondary battery that has become in an abnormal state, such as the secondary battery having received an excessive current or the like, is reused, which is not preferable.

SUMMARY OF THE INVENTION

The present invention has been achieved in the light of the above circumstances, and an object of the present invention is to make it possible to prevent a continuous use of a secondary battery that has become in an abnormal state.

A first aspect of the present invention provides a secondary battery system that includes a secondary battery, an abnormality detecting unit which detects an abnormality of the secondary battery, and a signal generating circuit which outputs a signal to an externally connected device for operating in cooperation with the secondary battery based on detection information of the abnormality detecting unit. The signal generating circuit includes a circuit element that is held at least in a first state and in a second state. The signal generating circuit is configured to change an output state of a signal to the externally connected device based on whether the circuit element is in the first state or in the second state. The signal generating circuit is configured to switch the circuit element from the first state to the second state when the abnormality detecting unit has detected an abnormality of the secondary battery, and not to return the circuit element to the first state.

More specifically, the signal generating circuit includes the circuit element that can be held at least in the first state and in the second state, and an output state of a signal to the externally connected device in the signal generating circuit is caused to depend on the state of the circuit element.

As a control operation to the circuit element, when the secondary battery is in an abnormal state, the circuit element is switched from the first state to the second state, and the circuit element is caused not to return to the first state. With this arrangement, the output state in the case where the secondary battery is in an abnormal state can be held.

A second aspect of the present invention is that, in addition to the configuration of the first aspect of the present invention, the first state of the circuit element corresponds to a state where a part of an energizing path of the signal generating circuit is closed, and the second state of the circuit element correspond to a state where a part of the energizing path of the signal generating circuit is opened.

More specifically, the circuit element can be switched between the first state and the second state only by opening and closing the energizing path of the signal generating circuit. Therefore, the configuration of the circuit element can be simplified.

Further, by setting the second state to the state where a part of the energizing path of the signal generating circuit is opened, an operation of higher safety is possible as compared with a case of setting the second state to the state where a part of the energizing path of the signal generating circuit is closed.

More specifically, when the second state is set to the state where a part of the energizing path of the signal generating circuit is closed, there is a possibility that if a disconnection occurs in the energizing path of the signal generating circuit, the signal generating circuit outputs a signal indicating that the circuit element is in the first state and the secondary battery system is continuously used, although the circuit element is actually in the second state. However, when the second state is set to the state where a part of the energizing path of the signal generating circuit is opened, such a situation can be avoided.

A third aspect of the present invention is that, in addition to the configuration of the second aspect of the present invention, the circuit element is a fuse, and the first state is switched to the second state by blowing out the fuse.

More specifically, because open/close switching of the energizing path is performed by blowing out the fuse, the configuration of the circuit element can be further simplified, and switching from the closed state (the first state) to the open state (the second state) can be performed securely.

A fourth aspect of the present invention is that, in addition to the configuration of any one of the first to third aspects of the present invention, the abnormality detecting unit is configured to detect an abnormality when a current or a voltage of the secondary battery has reached a set value that is set in advance.

More specifically, an abnormality of the secondary battery is typically exemplified by the states where an excessive current has flown to the secondary battery and where an excessive voltage has been applied to the secondary battery. Such abnormal states of the secondary battery can be properly detected.

A fifth aspect of the present invention is that, in addition to the configuration of the third aspect of the present invention, the fuse is provided as a thermal fuse, and the abnormality detecting unit is configured to cause a current for blowing out the thermal fuse to pass to a heating element that heats the thermal fuse, upon detection of an abnormality of the secondary battery.

More specifically, as the fuse that is blown out based on a detection operation of the abnormality detecting unit, although it is also possible to use a type of a fuse (a current fuse) that is blown out when a current applied to the fuse reaches a set value, power necessary to blow out the fuse can be reduced by providing the fuse as a thermal fuse and by combining the fuse with the heating element for blowing out the fuse. Therefore, the circuit configuration of the signal generating circuit can be simplified.

A sixth aspect of the present invention is that, in addition to the configuration of the fifth aspect of the present invention, two thermal fuses configured identically with the thermal fuse described above are arranged so as to be connected in series at an intermediate position of a wiring that connects between a position at a higher potential side than a negative electrode of the secondary battery and a control output terminal for outputting the signal. The heating element is arranged at an intermediate position of a wiring that connects between a connection position of the two thermal fuses and an output of the abnormality detecting unit. The two thermal fuses and the heating element are accommodated in one package.

More specifically, in the signal generating circuit, it is sufficient to provide only one thermal fuse for a circuit operation of blowing out the thermal fuse based on detection information of the abnormality detecting unit and outputting a signal corresponding thereto.

However, usually, the thermal fuse and the heating element that heats the thermal fuse are stored in one package, and it is advantageous to arrange the two thermal fuses connected in series in one package, from a viewpoint of circuit installation.

Because the heating element that heats the two thermal fuses is connected to the connection position between the two thermal fuses connected in series, the thermal fuses are arranged symmetrically with respect to the heating element.

Therefore, it is possible to freely set whether which one of the two thermal fuses connected in series can be connected to the secondary battery or can be connected to the externally connected device, and there is increased a degree of flexibility in arranging a circuit part that accommodates the thermal fuses and the heating element in one package. Accordingly, convenience of a circuit design can be improved.

A seventh aspect of the present invention is that, in addition to the configuration of any one of the first to sixth aspects of the present invention, the externally connected device is a charger that charges the secondary battery, and the signal generating circuit is configured to output a signal that causes the charger to stop a charge operation, upon switching of the circuit element from the first state to the second state.

More specifically, the secondary battery becomes in an abnormal state mainly in a case where the secondary battery is being charged by the charger. In such a case, continuous use of the secondary battery can be properly prevented.

An eighth aspect of the present invention provides a charging system for a secondary battery, which includes the secondary battery system according to the seventh aspect of the present invention, and the charger that is detachably attached to the secondary battery system.

When the secondary battery is in an abnormal state in such a system that can suitably charge the secondary battery by attaching and detaching the charger to and from the secondary battery system, this information can be held in the circuit element of the signal generating circuit.

BRIEF DESCRIPTION OF THE DRAWINGS

The foregoing and other features of the invention will become apparent to one skilled in the art to which the present invention relates upon consideration of the invention with reference to the accompanying drawings, wherein.

DETAILED DESCRIPTION OF THE INVENTION

Preferred embodiments of the present invention will be described hereinafter.

Figure 1:
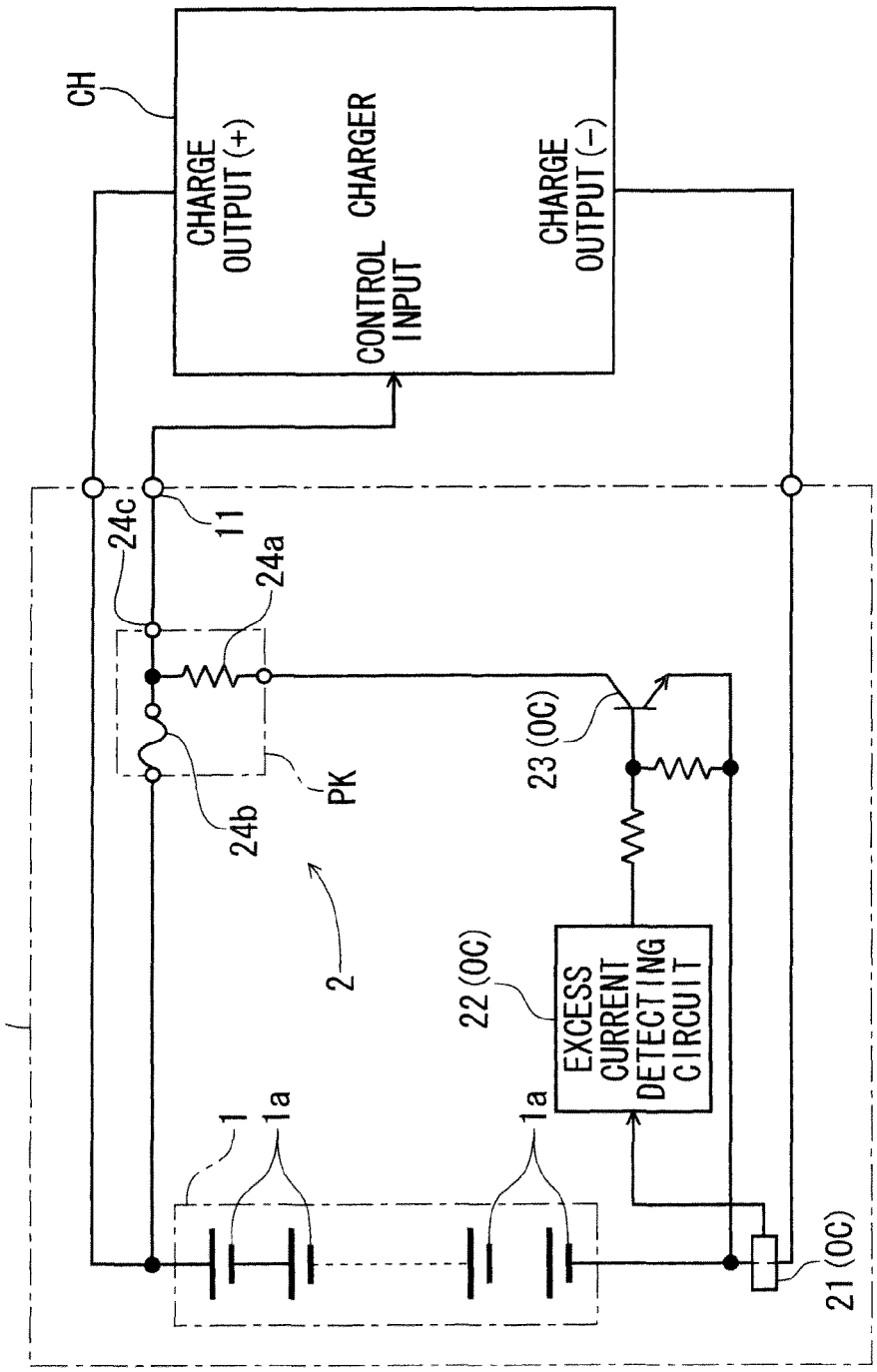
FIG. 1 is a configuration diagram of a secondary battery system according to an embodiment of the present invention.

A secondary battery system BS according to the present embodiment constitutes a charging system for a secondary battery, together with a charger CH that is detachably attached to the secondary battery system BS, as shown in FIG. 1.

The secondary battery system BS includes a secondary battery 1 that is charged by the charger CH, and the charger CH is an externally connected device that operates in cooperation with the secondary battery 1.

The secondary battery system BS according to the present embodiment has a setting of a flow of an excessive current in the secondary battery 1 as an abnormality of the secondary battery 1, and includes an abnormality detecting unit OC that detects whether the secondary battery 1 has become in a state being set as abnormal (that is, an abnormal state), and a signal generating circuit 2 that outputs a signal to the charger CH based on detection information of the abnormality detecting unit OC. The abnormality detecting unit OC and the signal generating circuit 2 are integrated with the secondary battery 1, and the secondary battery system is provided in a mode of what is called a battery pack or in a mode in which the signal generating circuit 2 and the like are fixed to a casing of the secondary battery 1, for example.

A signal that the signal generating circuit 2 outputs to the charger CH is output as a charge prohibition signal to cause a charge operation to the secondary battery 1 to be stopped in the present embodiment.

As the secondary battery 1, various secondary batteries such as a nickel hydride battery can be used, in addition to a lithium ion battery as a non-aqueous electrolyte secondary battery, for example.

The present embodiment exemplifies a case of configuring the secondary battery 1 by connecting a plurality of electric cells 1a in series as an assembled battery.

The abnormality detecting unit OC is configured by a current sensor 21 that detects a current flowing to the secondary battery 1, an excess current detecting circuit 22 that detects whether an excess current has flown to the secondary battery 1 based on a detection signal of the current sensor 21, and a bipolar transistor 23 that is turned on/off based on an output signal of the excess current detecting circuit 22. The signal generating circuit 2 is mainly configured by a heater 24a as a heating element of a resistance heating type which is connected to a collector of the transistor 23, and a thermal fuse 24b as a type of a fuse. The thermal fuse 24b is arranged at an intermediate position of a wiring that connects between a position at a higher potential side than a negative electrode of the secondary battery 1 (specifically, a positive pole of the secondary battery 1) and a control output terminal 11 which outputs the charge prohibition signal. The heater 24a is connected to the control output terminal 11 side of the thermal fuse 24b.

The excess current detecting circuit 22 outputs a signal of an L level to the transistor 23 when a detection signal of the current sensor 21 has a lower value than a set value that is set in advance (hereinafter, referred to as a "charge-stop set value"), and outputs a signal of an H level to the transistor 23 when the detection signal of the current sensor 21 reaches the charge-stop set value.

The charge-stop set value corresponds to a current value that is set in advance as a value indicating that it is not preferable to continue a charge operation to the secondary battery 1.

Therefore, a timing when the current of the secondary battery 1 reaches the set value (the charge-stop set value) set in advance to indicate to stop the charging operation is detected as an abnormal state.

The collector of the transistor 23 as an output of the abnormality detecting unit OC is connected to the heater 24a.

The heater 24a and the thermal fuse 24b are arranged as one circuit part accommodated in a single package PK, and this circuit part is configured to blow out the thermal fuse 24b by heat that is generated by the heater 24a when a predetermined current is applied to the heater 24a.

A connection position between the heater 24a and the thermal fuse 24b on the electric circuit is drawn out to the control output terminal 11 to output a "charge prohibition signal" to the charger CH, via an output terminal 24c of the package PK.

More specifically, the thermal fuse 24b is a circuit element that can be held in a first state where a part of an energizing path of the signal generating circuit 2 is closed while not being blown out, and a second state where a part of the energizing path of the signal generating circuit 2 is opened while being blown out. An output state of a signal to the charger CH is changed based on whether the thermal fuse 24b is in the first state or in the second state.

The charger CH that charges the secondary battery 1 of the secondary battery system BS of the above configuration includes a "control input" in addition to positive and negative "charge outputs" for supplying a charge current to the secondary battery 1.

The "control input" is an input terminal that receives the "charge prohibition signal", and the "control input" is connected to the control output terminal 11 of the secondary battery system BS.

The "control input" of the charger CH is pull-down connected at a internal side of the charger CH, and a charge operation is performed from a charge output terminal to the secondary battery 1 only in a state where a signal of the H level is input to the "control input".

On the other hand, when the "control input" is at the L level or is opened, the charge operation to the secondary battery 1 is stopped.

Next, an outline of an operation of the secondary battery system BS having the above configuration is explained.

In a state where a charge operation is normally performed as usual by having the secondary battery system BS and the charger CH connected to each other, a detection signal of the current sensor 21 is sufficiently smaller than the charge-stop set value, an output of the excess current detecting circuit 22 to a base of the transistor 23 is at the L level, and the transistor 23 is held in an off state. Therefore, no current flows to the heater 23a.

In this state, a positive electrode voltage of the secondary battery 1 is output from the control output terminal 11 via the thermal fuse 24b.

Therefore, the "control input" of the charger CH is at the H level, and a charge current continuously supplied from the "charge output" of the charger CH to the secondary battery 1.

On the other hand, for any reason, in a case where a current supplied from the charger CH to the secondary battery 1 is excessive, or a case where a separate current source is provided between the secondary battery system BS and the charger CH (not shown in FIG. 1) and an excessive current flows to the secondary battery 1 from the separate current source, an output of the excess current detecting circuit 22 to the base of the transistor 23 reaches the H level, and the transistor 23 is switched from an off state to an on state when a detection signal of the current sensor 21 reaches the charge-stop set value.

Accordingly, a current is applied from the positive electrode of the secondary battery 1 to the heater 24a via the thermal fuse 24b, and the heater 24a heats to blow out the thermal fuse 24b. In other words, the thermal fuse 24b is switched from the first state to the second state. The thermal fuse 24b after having been switched to the second state does not return to the first state.

After the thermal fuse 24b is blown out, an electric wiring from the positive electrode of the secondary battery 1 is interrupted, and an output signal of the control output terminal 11 shifts from the H level to the L level. A state where an output level of the control output terminal 11 is at the L level is an output state where the "charge prohibition signal" is output.

When a signal input from the control output terminal 11 to the "control input" of the charger CH shifts from the H level to the L level, supply of a charge current from the "charge output" to the secondary battery 1 is stopped, and the charge operation is stopped.

Thereafter, even when a reset operation is performed at the charger CH side and restart of the charge operation to the secondary battery system BS that is connected is instructed, the state where the "charge prohibition signal" is output is held and the charger CH does not restart the charge operation, because the thermal fuse 24b of the signal generating circuit 2 in the secondary battery system BS is in a blown out state (the second state). Abnormality of the secondary battery system BS can be checked by monitoring the state of the "charge prohibition signal".

Another Embodiment

Another embodiment of the present invention is described below.

Figure 2:
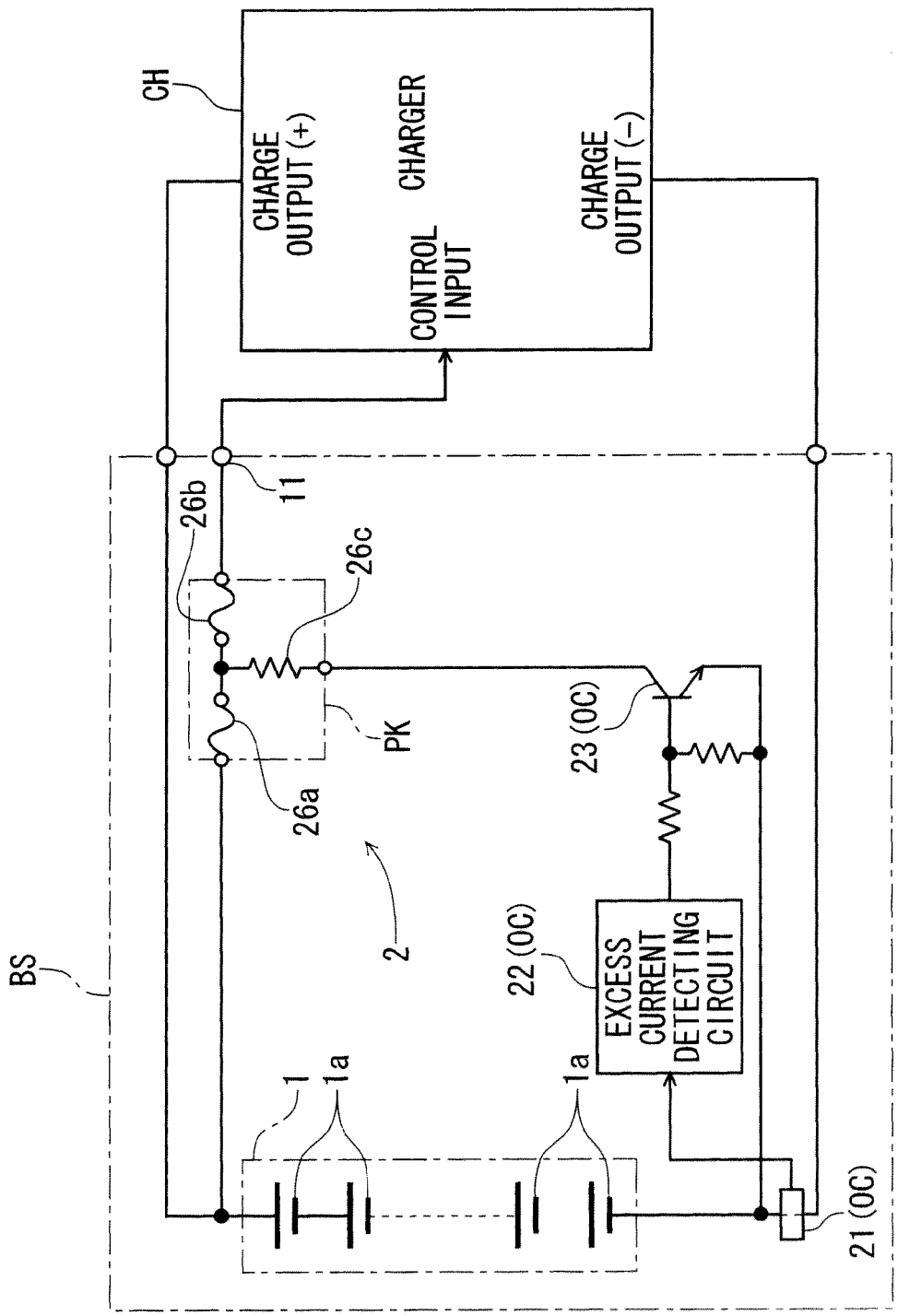
FIG. 2 is a configuration diagram of a secondary battery system according to another embodiment of the present invention.

(1) In the above embodiment, the case where the thermal fuse 24b and the heater 24a that constitute the signal generating circuit 2 are accommodated in one package is exemplified. Alternatively, a circuit part that accommodates two thermal fuses 26a, 26b, and one heater 26c as a heating element, in one package, can be used, as shown in FIG. 2. An arrangement to blow out the thermal fuses 26a, 26b by carrying a current to the heater 26c is similar to that in the above embodiment. In the present embodiment, basically, the heater 26c simultaneously blows out the two thermal fuses 26a, 26b.

As a wiring mode of the two thermal fuses 26a, 26b and the heater 26c, the two thermal fuses 26a, 26b are connected in series and are arranged at an intermediate position of the wiring that connects between a position at a higher potential side than the negative electrode of the secondary battery 1 (specifically, the positive electrode of the secondary battery 1) and the control output terminal 11 which outputs the charge prohibition signal. The heater 26c is arranged at an intermediate position of the wiring that connects between a connection position of the two thermal fuses 26a, 26b and an output of the abnormality detecting unit OC, that is, the collector of the transistor 23.

As is obvious from FIG. 2, the wirings of the thermal fuses 26a, 26b are symmetrical with respect to the connection position with the heater 26c, and there is a degree of flexibility in performing exactly a similar operation even when an input and an output are replaced with each other.

Configurations of parts other than the thermal fuses 26a, 26b, and the heater 26c are similar to those in the above embodiment, including the configuration of the charger CH.

An operation of the secondary battery system B shown in FIG. 2 is substantially similar to that in the above embodiment, and is therefore explained briefly.

In a state where a charge operation is normally performed as usual by having the secondary battery system BS and the charger CH connected with each other, the transistor 23 is in an off state, a positive electrode voltage of the secondary battery 1 is output to the control output terminal 11 via the thermal fuse 24b, and a charge current is continuously supplied from the "charge output" of the charger CH to the secondary battery 1.

On the other hand, for any reason, in a case where a current supplied from the charger CH to the secondary battery 1 becomes excessive, or in a case where a separate current source is provided between the secondary battery system BS and the charger CH (not shown in FIG. 2) and an excessive current flows to the secondary battery 1 from the separate current source, the transistor 23 is switched from an off state to an on state, a current is applied to the heater 26c via the thermal fuse 26a, and the heater 26c heats to blow out the thermal fuses 26a, 26b when a detection signal of the current sensor 21 reaches the charge-stop set value.

When the thermal fuses 26a, 26b are blown out, an output signal of the control output terminal 11 shifts to an "open" state. In this case, a state where an output level of the control output terminal 11 is "open" is an output state where the "charge prohibition signal" is output.

When a signal that is input from the control output terminal 11 to the "control input" of the charger CH shifts from the "open" state, a charge current from the "charge output" to the secondary battery 1 is stopped, and the charge operation is stopped.

Thereafter, even when a reset operation is performed at the charger CH side and restart of the charge operation to the secondary battery system BS that is connected is instructed, a state where the "charge prohibition signal" is output is held and the charger CH does not restart the charge operation, because the thermal fuses 26a, 26b of the signal generating circuit 2 in the secondary battery system BS are in a blown out state.

When the thermal fuse 26a is blown out prior to the thermal fuse 26b and the thermal fuse 26b is not blown out in the two thermal fuses, an operation exactly similar to that in the above embodiment is performed.

(2) In the above embodiment, there is exemplified the case where the abnormality detecting unit OC detects a current flowing to the secondary battery 1 using the current sensor 21. Alternatively, the abnormality detecting unit OC may detect a voltage of the secondary battery 1 and the signal generating circuit may output the "charge prohibition signal" when the detected voltage reaches a set voltage set in advance.

Further, the abnormality detecting unit OC can include a temperature sensor, a liquid-leakage sensor, or a pressure sensor for detecting a battery swelling, so as to detect an excessive temperature increase of the secondary battery 1, a liquid leakage of the secondary battery or an excessive swelling of the secondary battery 1 as the abnormal state. A mode of the abnormal state can be suitably set.

(3) In the above embodiment, although the thermal fuse 24b is exemplified as a fuse included in the signal generating circuit 2, a general current fuse can be alternatively used. In this case, while the heater 24a is unnecessary, a current passing between the collector and an emitter of the transistor 23 needs to be large to some extent.

(4) In the above embodiment, although the bipolar transistor is exemplified as a unit to turn on/off a current passing to the heater 24a in order to heat the thermal fuse 24b, another on/off unit such as an FET can be alternatively used.

(5) In the above embodiment, although the current sensor 21 is exemplified as a unit that detects a current of the secondary battery 1, a shunt resistor can be alternatively used.

(6) In the above embodiment, the thermal fuse 24b is exemplified as a circuit element that can be held in the first state and in the second state. As such a circuit element that can be held in these states, there are various circuit elements such as a latching relay and a nonvolatile logic counter in addition to the thermal fuse 24b, and any of these circuit elements can be alternatively used in place of the thermal fuse 24b.

Figure 3:
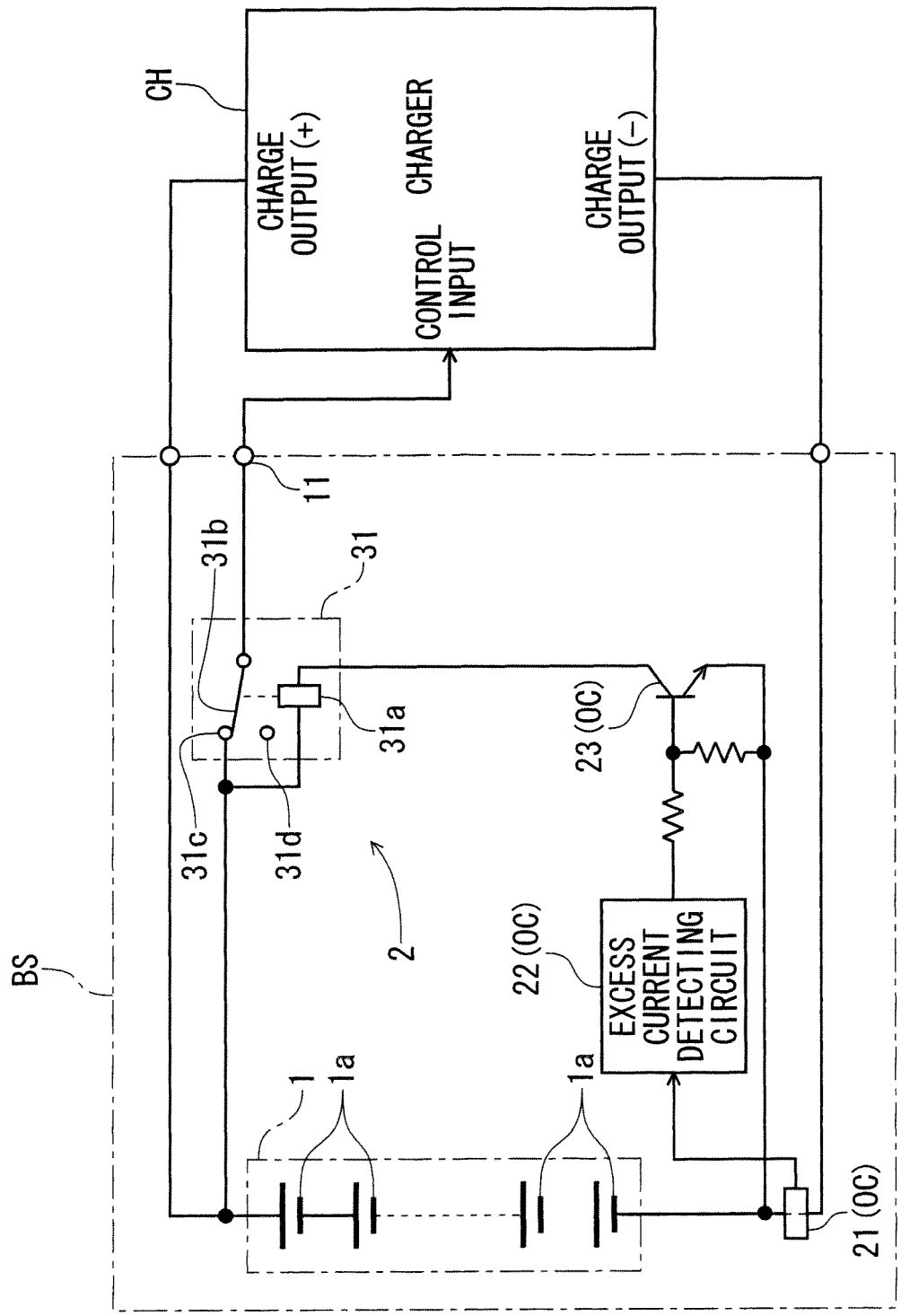
FIG. 3 is a configuration diagram of a secondary battery system according to still another embodiment of the present invention.

For example, FIG. 3 shows a case where a latching relay 31 is used in place of the heater 24a and the thermal fuse 24b in the above embodiment.

In the latching relay 31, a contact piece 31b and a contact point 31c that is connected to the positive electrode of the secondary battery 1 are brought into contact with each other as normally closed, and this state corresponds to the first state.

When the abnormality detecting unit OC of a configuration similar to that in the above embodiment detects that an excessive current has flown to the secondary battery 1, the transistor 23 is switched from an off state to an on state, and a current is applied to a set coil 31a of the latching relay 31.

Accordingly, the contact piece 31b is switched to a state in contact with the contact point 31d. This state corresponds to the second state.

Due to a switching from the first state to the second state, an output level of the control output terminal 11 becomes an "open" state, which is an output state where the "charge prohibition signal" is output.

The latching relay 31 is held in the second state and does not return to the first state, unless a current in a reverse direction passes to the set coil 31a or the latching relay 31 includes a separate reset coil and displaces the contact piece 31b.

Figure 4:
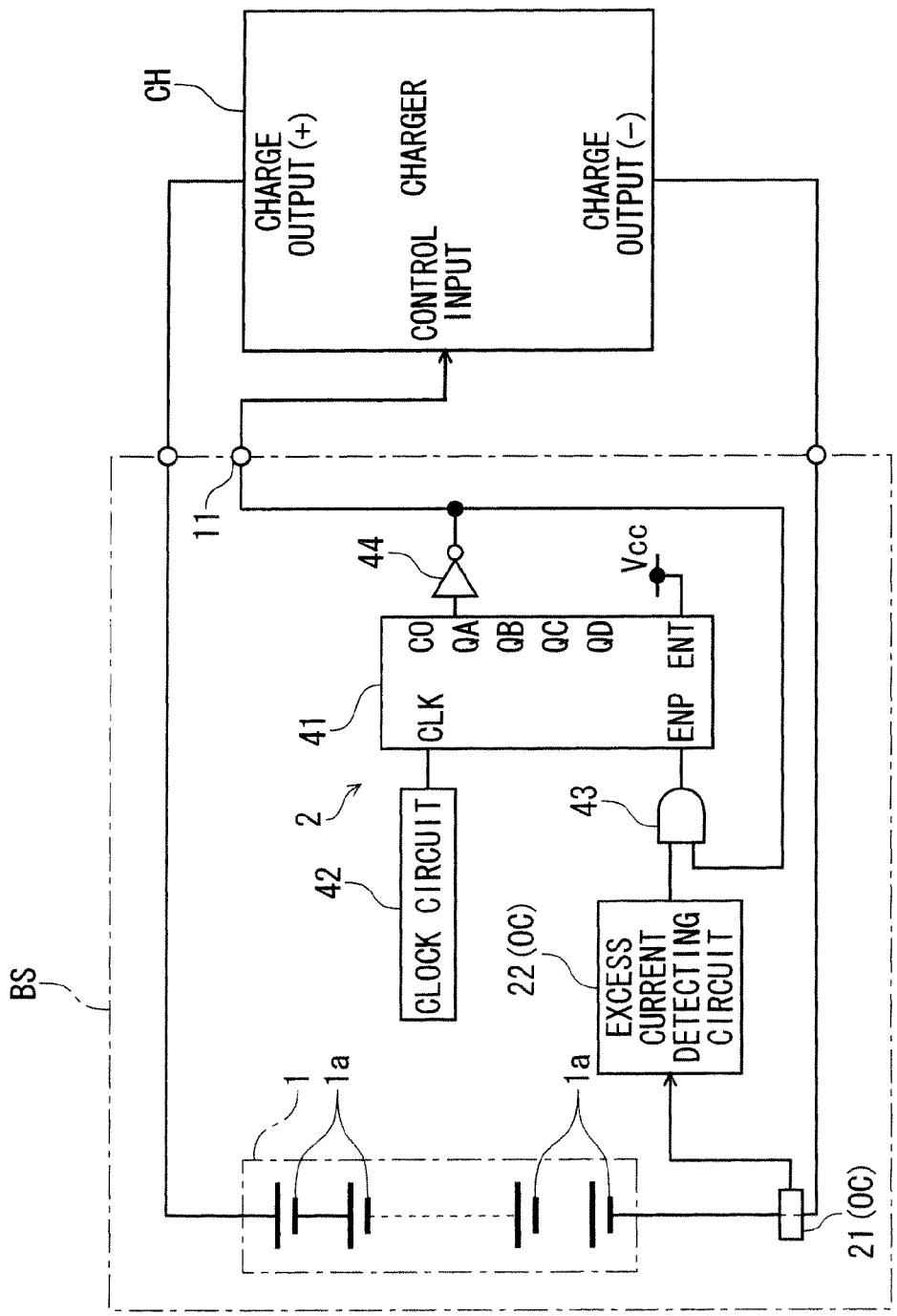
FIG. 4 is a configuration diagram of a secondary battery system according to further another embodiment of the present invention.

Next, FIG. 4 shows a case where the signal generating circuit 2 is configured by including a nonvolatile logic counter in place of the thermal fuse 24b.

The signal generating circuit shown in FIG. 4 is configured mainly by a nonvolatile logic counter 41, a clock circuit 42 that supplies a clock signal used for a count operation, an AND circuit 43 that generates a signal for a count control based on a detection signal of the excess current detecting circuit 22 configured similarly to that in the above embodiment, and a NOT circuit 44 that inverts an output of the nonvolatile logic counter 41.

The nonvolatile logic counter 41 is a circuit element that includes a nonvolatile register and has a function to hold a count value even during a power interruption. FIG. 4 shows the nonvolatile logic counter 41 as a four-bit counter, but only one bit is used out of these bits. In the circuit example in FIG. 4, a lowest order bit is used. The nonvolatile logic counter 41 also includes input/output terminals such as a data input for a preset, in addition to terminals shown in the figure. However, description of terminals that are not directly related to an operation is not provided.

A count output terminal "QA" of the nonvolatile logic counter 41 has two output values of the "L level" and the "H level". The "L level" as an initial value corresponds to the first state, and the "H level" corresponds to the second state. The count output terminal "QA" is held in any one of these two states even when a power source is interrupted. Therefore, a signal from the signal generating circuit 2 to the control input of the charger CH is a signal for stopping a charge operation if the control output terminal 11 is at the "L level".

When a clock signal from the clock circuit 42 is input to a "CLK" in a case where both an "ENP" and an "ENT" as enable inputs of the nonvolatile logic counter 41 are "H level" inputs, the nonvolatile logic counter 41 counts this clock signal.

The excess current detecting circuit 22 outputs a signal at the "L level" when a detection signal of the current sensor 21 has a value lower than the charge-stop set value, while outputting a signal at the "H level" when the detection signal reaches the charge-stop set value.

When the excess current detecting circuit 22 detects the abnormal state and outputs a signal at the "H level" to the AND circuit 43, the "ENP" input of the nonvolatile logic counter 41 is at the "H level" because an output of the NOT circuit 44 is at the "H level". The other enable input "ENT" is connected to a "Vcc" as a voltage power source of the circuit and is at the "H level". Therefore, at this time, the nonvolatile logic counter 41 is in a state where a count operation is possible.

In this state, when a clock signal is input to the "CLK", this clock is counted and the "QA" is switched to the "H level", that is, into the second state.

As a result, an output of the NOT circuit 44 reaches the "L level", and is transmitted to the control input of the charger CH from the control output terminal 11, as a signal for stopping the charge operation.

Because the output of the NOT circuit 44 is also input to the AND circuit 43 and because the output of the NOT circuit 44 is at the "L level", the output of the AND circuit 43 reaches the "L level" and stops the count operation of the nonvolatile logic counter 41. That is, even when the input signal from the excess current detecting circuit 22 changes to any value, a clock signal that is continuously input from the clock circuit 42 is not counted, and the output "QA" maintains the "H level" (the second state) and does not return to the "L level" (the first state).

(7) In the above embodiment, although the charger CH is exemplified as an externally connected device, the present invention can be also applied to a case where various loads or alarm devices are connected as externally connected devices.

According to an aspect of the present invention, by holding information indicating that a secondary battery has become in an abnormal state based on a state of a circuit element included in a signal generating circuit, a continuous use of the secondary battery that has become in the abnormal state can be prevented.

What is claimed is:

1. A secondary battery system, comprising:
a secondary battery;
an abnormality detecting unit that detects an abnormality of the secondary battery;
a signal generating circuit that outputs a signal based on detection information of the abnormality detecting unit;
a pair of terminals to which an externally connected device is electrically connected;
a control output terminal that outputs the signal from the signal generating circuit to the externally connected device;
a first wiring that connects an electrode of the secondary battery to the externally connected device through the control output terminal; and
a second wiring that connects the electrode of the secondary battery to the externally connected device through the pair of terminals,
wherein the signal generating circuit includes a circuit element that is held at least in a first state and in a second state,
wherein the circuit element is located in the first wiring at an intermediate position that connects the secondary battery and the control output terminal,
wherein the signal generating circuit changes an output state of the signal to the externally connected device based on whether the circuit element is in the first state or the second state, and
wherein the signal generating circuit switches the circuit element from the first state to the second state when the abnormality detecting unit detects an abnormality of the secondary battery, and the circuit element does not return to the first state.

2. The secondary battery system according to claim 1, wherein the first state of the circuit element corresponds to a state where a part of an energizing path of the signal generating circuit is closed, and the second state of the circuit element corresponds a state where the part of the energizing path of the signal generating circuit is opened.

3. The secondary battery system according to claim 2, wherein the circuit element comprises a fuse, and the first state is switched to the second state by blowing out the fuse.

4. The secondary battery system according to claim 1, wherein the abnormality detecting unit detects the abnormality when a current or a voltage of the secondary battery reaches a set value that is set in advance.

5. The secondary battery system according to claim 3, wherein the fuse comprises a thermal fuse, and
wherein the abnormality detecting unit causes a current for blowing out the thermal fuse to pass to a heating element that heats the thermal fuse, upon detection of an abnormality of the secondary battery.

6. The secondary battery system according to claim 5, wherein two thermal fuses configured identically with the thermal fuse are arranged so as to be connected in series at an intermediate position of the first wiring that connects between a position at a higher potential side than a negative electrode of the secondary battery and the control output terminal that outputs the signal,
wherein the heating element is arranged at an intermediate position of the first wiring that connects between a connection position of the two thermal fuses and an output of the abnormality detecting unit, and wherein the two thermal fuses and the heating element are accommodated in one package.

7. The secondary battery system according to claim 1, wherein the externally connected device comprises a charger that charges the secondary battery through the second wiring, and wherein the signal generating circuit outputs a signal that causes the charger to stop a charge operation, upon switching of the circuit element from the first state to the second state.

8. A charging system for a secondary battery, comprising the secondary battery system according to claim 7, and the charger that is detachably attached to the secondary battery system.

9. The secondary battery system according to claim 1, wherein the signal generating circuit including the circuit element is located between the externally connected device and the secondary battery.

10. The secondary battery system according to claim 1, wherein the signal generating circuit including the circuit element is located between an input section of the externally connected device and cells of the secondary battery.

11. The secondary battery system according to claim 1, further comprising:

a transistor that is turned on/off based on an output signal of the abnormality detecting unit, wherein the signal generating circuit is coupled to the transistor.

12. The secondary battery system according to claim 11, wherein the signal generating circuit comprises:

a fuse that blows out when the first state is switched to the second state; and a heating element coupled to the transistor.

13. The secondary battery system according to claim 12, wherein the fuse is located at an intermediate position of the first wiring that connects cells of the secondary battery and the control output terminal.

14. The secondary battery system according to claim 13, wherein the heating element is connected to the first wiring at a connection position located between the control output terminal and the fuse.

15. The secondary battery system according to claim 13, wherein a connection position on the first wiring between the heating element and the fuse is coupled to the control output terminal.

* * * * *